United States Patent
Liaw et al.

(10) Patent No.: US 7,824,581 B2
(45) Date of Patent: Nov. 2, 2010

(54) COCRYSTALLINE METALLIC COMPOUNDS AND ELECTROCHEMICAL REDOX ACTIVE MATERIAL EMPLOYING THE SAME

(75) Inventors: Ben-Jie Liaw, Taoyuan (TW); Yu-Fang Chen, Taoyuan (TW); Wen-Ren Liu, Taoyuan (TW); Sheng-Shih Chang, Taoyuan (TW)

(73) Assignee: Advanced Lithium Electrochemistry Co., Ltd., Taoyuan (TW)

( * ) Notice: Subject to any disclaimer, the term of this patent is extended or adjusted under 35 U.S.C. 154(b) by 236 days.

(21) Appl. No.: 11/764,629

(22) Filed: Jun. 18, 2007

(65) Prior Publication Data

US 2008/0308773 A1 Dec. 18, 2008

(51) Int. Cl.
*H01B 1/06* (2006.01)
*H01M 4/48* (2010.01)

(52) U.S. Cl. ............ 252/518.1; 252/521.2; 429/218.1

(58) Field of Classification Search .............. 252/518.1, 252/520.21, 521.2, 521.5; 423/306; 429/218.1
See application file for complete search history.

(56) References Cited

U.S. PATENT DOCUMENTS

| | | | |
|---|---|---|---|
| 5,910,382 A | 6/1999 | Goodenough et al. | |
| 6,514,640 B1 | 2/2003 | Armand et al. | |
| 6,716,372 B2 | 4/2004 | Barker et al. | |
| 6,815,122 B2 | 11/2004 | Barker et al. | |
| 6,884,544 B2 | 4/2005 | Barker et al. | |
| 7,001,690 B2 | 2/2006 | Barker et al. | |
| 7,026,072 B2 | 4/2006 | Barker et al. | |
| 7,087,346 B2 | 8/2006 | Barker et al. | |
| 7,390,473 B1 * | 6/2008 | Singhal et al. | 423/306 |
| 2003/0215715 A1 | 11/2003 | Barker et al. | |
| 2004/0005265 A1 | 1/2004 | Chiang et al. | |
| 2006/0060827 A1 * | 3/2006 | Ravet et al. | 252/506 |
| 2006/0147809 A1 * | 7/2006 | Amine et al. | 429/326 |
| 2006/0246351 A1 | 11/2006 | Barker et al. | |
| 2007/0031732 A1 | 2/2007 | Chiang et al. | |
| 2007/0082267 A1 | 4/2007 | Goodenough et al. | |
| 2007/0264567 A1 * | 11/2007 | Yang et al. | 429/209 |
| 2009/0081549 A1 * | 3/2009 | Liaw et al. | 429/222 |

FOREIGN PATENT DOCUMENTS

WO 2004/057691 7/2004
WO 2007/000251 1/2007

OTHER PUBLICATIONS

Aleees-NCO "LFP-NCO Cathode Material", www.alees.com/en/product/LFP-NCO.htm (no pub date) pp. 1-6.*
G.X. Wang et.al.: J. Electrochem.Soc., vol. 153, No. 1, 2006, pp. A25-A31, XP002498456.
A. Eftekhari: J. Electrochem.Soc., vol. 151, No. 11, 2004, pp. A1816-A1819, XP002498457.
N. N. Bramnik et al.: J. Solid State Electrochem., vol. 8, 2004, pp. 558-564, XP002498458.
A.D. Spong et.al.: J. Electrochem.Soc., vol. 152, No. 12, 2005, pp. A2376-2382, XP002498459.

* cited by examiner

*Primary Examiner*—Mark Kopec

(57) ABSTRACT

The present invention includes an electrochemical redox active material. The electrochemical redox active material includes a cocrystalline metallic compound having a general formula $A_xMO_{4-y}XO_y \cdot M'O$, where A is at least one metallic element selected from a group consisting of alkali metals, M and M' may be identical or different and independently of one another at least one selected from a group consisting of transition metals and semimetals, X is P or As, $0.9 \leq x \leq 1.1$, and $0 < y < 4$.

7 Claims, 6 Drawing Sheets

Table 1

| Metal Oxide | 1st Charge Capacity (mAh/g) | 1st Discharge Capacity (mAh/g) | 10th Charge Capacity (mAh/g) | 10th Discharge Capacity (mAh/g) |
|---|---|---|---|---|
| MgO | 131 | 131 | 133 | 132 |
| $TiO_2$ | 168 | 144 | 147 | 146 |
| $V_2O_5$ | 165 | 141 | 145 | 143 |

Table 2

| Metal Oxide | $V_2O_5$ | MgO | $TiO_2$ |
|---|---|---|---|
| a [Å] | 10.3563 | 10.3508 | 10.3410 |
| b [Å] | 6.0160 | 6.0144 | 6.0203 |
| c [Å] | 4.6934 | 4.6979 | 4.6956 |
| α, β, γ [deg] | 90 | 90 | 90 |
| V [Å$_3$] | 292.4 | 292.5 | 292.3 |

US 7,824,581 B2

COCRYSTALLINE METALLIC COMPOUNDS AND ELECTROCHEMICAL REDOX ACTIVE MATERIAL EMPLOYING THE SAME

FIELD OF THE INVENTION

The present invention relates to a series of metallic compounds, and more particularly to a series of cocrystalline metallic compounds which have the electrochemical redox active properties. The present invention also relates to a process of manufacturing the series of cocrystalline metallic compounds.

BACKGROUND OF THE INVENTION

Due to the spatial hindrance of spinel structures or olivine structures, the ion diffusibility and the electron conductivity are not satisfactory. Recently, some literatures have been focused on the crystalline solid-state electrolytes having perovskite structures as well as the oxides, sulfides, mixed oxide/sulfide glassy-state electrolytes thereof. Although the lithium ion diffusibility of these perovskite-type materials still have space of progress comparable with common liquid organic electrolytes at room temperature, the related researches were restricted to the solid-state electrolytes and the conductivities are still insufficient.

For enhancing the conductivities, the common approach includes the reduction of particle size or the addition of conductive material to lower the molecular energy level. Since the operating conditions of these methods are difficult to be controlled, the production cost is very high.

Another approach of enhancing the conductivities is mixing a conductive material in the olivine type compounds. Since alkane and alkene gases are produced during the process of pyrolyzing the organic material, the pyrolyzed product may cause environmental pollution and raise environmental concerns.

SUMMARY OF THE INVENTION

An object of the present invention is providing a cocrystalline composite material having enhanced ion diffusibility and electron conductivity.

Another object of the present invention is providing a process of manufacturing an electrochemical redox active material in a simplified manner to prevent environmental pollution.

In accordance with an aspect of the present invention, there is providing a composite material comprising a series of cocrystalline metallic compound having a general formula $A_xMO_{4-y}XO_y.M'O$, where A is at least one metallic element selected from a group consisting of alkali metals, M and M' may be identical or different and independently of one another at least one selected from a group consisting of transition metals and semimetals, X is P or As, $0.9 \leq x \leq 1.1$, and $0 \leq y \leq 4$.

In accordance with another aspect of the present invention, there is providing a process of manufacturing cocrystalline composite materials. The process includes steps of reacting a metal particle with a phosphate- or arsenate-containing compound to prepare a metallic compound $MO_{4-y}XO_y$, where M is at least one selected from a group consisting of transition metals and semimetals, and $0<y<4$; performing an alkalinization reaction of an alkali metal ion A(I), the metallic compound and an inorganic carrier M'O to prepare a semicrystalline nano-scale particle mixture containing $MO_{4-y}XO_y/A(I)/M'O$, where M' is at least one selected from a group consisting of transition metals and semimetals; drying the solution into a precursor; and calcining the precursor in the presence of an inert gas to form a cocrystalline composite material having a general formula $A_xMO_{4-y}XO_y.M'O$.

The above contents of the present invention will become more readily apparent to those ordinarily skilled in the art after reviewing the following detailed description and accompanying drawings, in which:

Table. 1 shows the specific capacity listing the first charge/discharge cycle and the tenth charge/discharge cycles of composite material $A_xMO_{4-y}XO_y.M'O/C$ at different metal oxide (M'O), wherein the applied charge/discharge voltage ranges from 2.0 V to 4.2V; the charge/discharge rate is set to C/5; and the temperature is maintained at room temperature; and Table. 2 shows the lattice constants of composite material $A_xMO_{4-y}XO_y.M'O/C$ at different metal oxide (M'O).

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Hereinafter, a process of manufacturing such electrochemical redox active material of the present invention will be illustrated as follows.

Reaction of a Metal Particle and a Phosphate- or Arsenate-Containing Compound

Firstly, a phosphate- or arsenate-containing solution is prepared by dissolving a phosphoric acid or a dilute arsenic acid or a salt thereof in solvent. Then, at least one metallic particle (M) selected from a first-Row transition metal, a second-row transition metal, a third-row transition metal or a semimetal is added to the phosphate- or arsenate-containing solution. The metallic particle is reacted with the phosphate- or arsenate-containing solution to form a metallic phosphate or arsenate protective shell. This shell is also referred as a self-assembled colloidal monolayer husk.

Typically, if the free acid content in the phosphate- or arsenate-containing solution is too low, the metal matrix is difficult to dissolve. Whereas, if the free acid content in the phosphate- or arsenate-containing solution is too high, the dissolving rate of the protective shell is increased and detrimental to shell formation. For optimizing the shell-forming ion concentration, the pH value of the phosphate- or arsenate-containing solution is adjusted by adding ionic, nonionic or amphoteric surfactants. An example of the surfactant includes but is not limited to Triton X-100 (a nonionic surfactant), BS-12 (Cocoal kanoy lamido propyl betaine, an amphoteric surfactant) or DNP (a cationic surfactant).

Figure 1A:
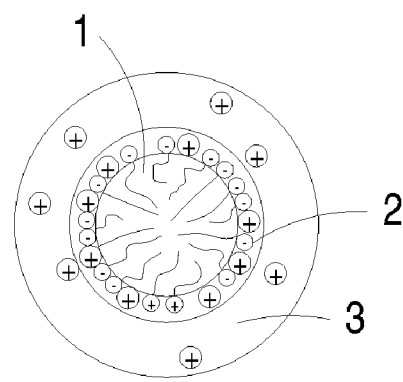
FIGS. 1(a) and (b) are schematic diagrams illustrating the interaction between the surfactant and the monolayer shell to facilitate detachment of the monolayer shell from the metal particle.
Figure 1B:
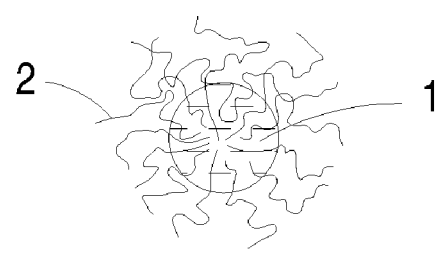

FIGS. 1($a$) and ($b$) are schematic diagrams illustrating the interaction between the surfactant diffusion layer and the monolayer shell to facilitate detachment of the monolayer shell from the metal particle. Generally, the self-assembled monolayer shell 2 may hinder contact between the phosphate- or arsenate-containing solution and the metallic particle 1, and thus inhibit propagation of the reaction of the metallic particle 1 with the phosphate- or arsenate-containing solution. The monolayer shell 2 is electric charged or neutral. If the monolayer shell 2 is electric charged and the surfactant is ionic or amphoteric, the surfactant may be electrically attracted onto the surface of the monolayer shell 2 to form a surfactant diffusion layer 3 due to electrostatic force. Whereas, the nonionic surfactant may be adsorbed onto the surface of the monolayer shell 2 due to a Van der wal force. The interaction between the surfactant diffusion layer 3 and the monolayer shell 2 may facilitate detachment of the monolayer shell 2 from the metal particle 1, so that the metallic particle 1 is continuously reacted with the phosphate- or arsenate-containing solution.

The continuous reaction of the metallic particle with the phosphate- or arsenate-containing solution results in a metallic compound $MO_{4-y}XO_y$, where M is at least one selected from a group consisting of transition metals or semimetal, and $0<y<4$.

Formation of an Semicrystalline Nano-Scale Particle Mixture

An alkali ion A(I) and an inorganic carrier M'O are incorporated into the metallic compound $MO_{4-y}XO_y$, where M' is at least one of any transition metal or semimetals. The alkali metal, the metallic compound and the inorganic carrier M'O are alkalinized to form an amorphous particle mixture. During alkalinization, the amorphous particle mixture is thoroughly milled to destroy the crystalline structure contained therein. As the milling time period is increased, the mixture is nano-sized. Consequently, the simultaneous alkalinization and milling may result in a semicrystalline nano-scale particle mixture $MO_{4-y}XO_y/A(I)/M'O$.

Spherical Clumping Art

By centrifugation, the semicrystalline nano-scale particle mixture is clumped into multiple droplets of nano-scale particles. Each droplet of nano-scale particle includes the metallic compound $MO_{4-y}XO_y$ as a core and alkali ion A(I) with the inorganic carrier M'O as the shell. Due to the surface tension generated when the droplets fly, the droplets have a tendency to become spherical. The moisture contained in the droplet surfaces will be evaporated when contacted with the surrounding hot air. By means of the capillary attraction acting on the pores of the nano-scale particles, the moisture contained in the interior portion of the nano-scale particles will be transferred to the surface and continuously evaporated to the surroundings. By controlling the flying time and the chamber temperature, desired precursors in a spherical form are generated.

Calcination

The spherical precursors are then subject to a multi-stage calcining operation by circular gas-solid phase heat treatment. In the presence of controlled inert gas circularly flowing into a furnace, carbon particles and the spherical precursors are introduced. The carbon particles and the spherical precursors will be suspended in the inert gas and mixed together. The shearing stress generated between adjacent particles allows the smaller carbon particles to be filled in the pores of the precursors. In addition, the reacted gases such as moisture or a hint of carbon dioxide are exhausted by the inert gas.

Figure 2:
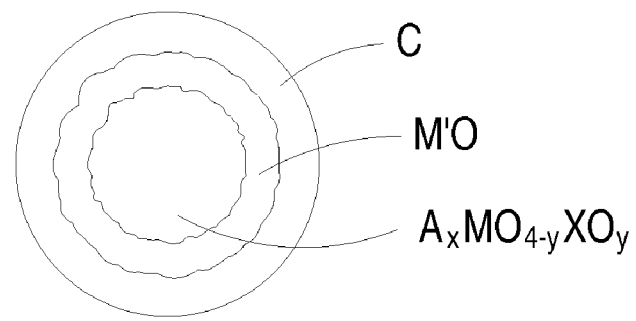
FIG. 2 is a schematic diagram of a multilayered crystalline material.

In the initial calcination stage of heat treatment, the precursors are subject to surface diffusion, bulk diffusion, evaporation and condensation, thereby forming a multilayered crystalline material. In the multilayered crystalline material, the core portion is substantially a crystalline compound $A_xMO_{4-y}XO_y$, and the shell portion includes a double-layer film C/M'O. Referring to FIG. 2, a schematic diagram of the multilayered crystalline material is illustrated.

In the intermediate calcination stage, the constituents of the core portion of the multilayered crystalline material are slowly diffused into the crystal grain boundary and then subject to a quicker grain boundary diffusion, thereby forming an olivine crystal structure. At the same time, the double-layer film at the shell portion of the multilayered crystalline material are contracted and closely coated around the core portion.

Figure 3:
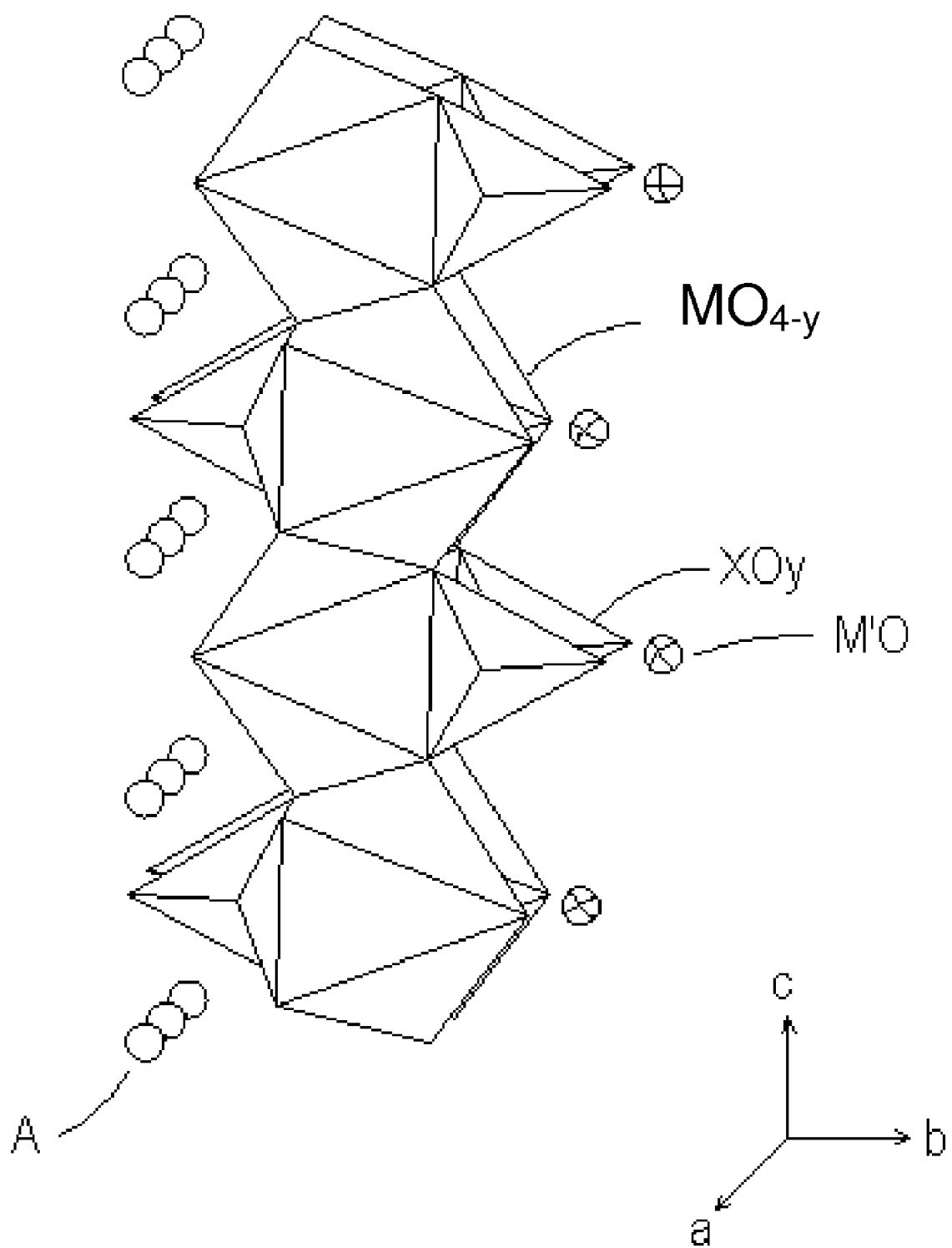
FIG. 3 is a schematic diagram illustrating crystal structure of a cocrystalline metallic compound.

The addition of a reducing agent may reduce the valence state of the central metal of the semicrystalline nano-scale particle mixture $MO_{4-y}XO_y/A(I)/M'O$ from 3 to 2. The overall structure thereof is substantially a neutral molecule. The matrix of the core portion is a polymeric chain including an octahedral structure and a tetrahedral structure along the ac-plane. In the octahedral structure, each central metal has a slightly distorted octahedral coordination geometry formed by six oxygen atoms. In the tetrahedral structure, the central phosphorus or arsenic atom (X) has a tetrahedral coordination geometry formed by four oxygen atoms, two of which are shared with the octahedral structure. An alkali ion (A) is disposed beside the matrix to balance the valence state. In the later calcination stage, the crystal structure is gradually compacted, and the gases contained in the pores of the precursors are evolved. Accordingly, a cocrystalline metallic compound having a general formula $A_xMO_{4-y}XO_y \cdot M'O$ is generated, as can be seen in FIG. 3.

In addition, during the calcination process, the inorganic carrier M'O and the carbon particles are also crystallized on the cocrystalline metallic compound, thereby resulting in a composite material $A_xMO_{4-y}XO_y \cdot M'O/C$ of the present invention.

By measuring the physical and chemical properties of the cocrystalline composite material, it is found that the addition of the inorganic carrier (M'O) maintains the crystal volume substantially unchanged but the axial length of the crystal lattice is slightly changed.

When a voltage is applied on the cocrystalline composite material, the central metal is oxidized such that the matrix molecular is neutrally charged. For balancing the overall valence state, the surrounding alkali ion is released and an electron is generated. In the presence of the inert atmosphere, the central metal is reduced and a current is generated in order to stabilize the structure. Moreover, it is demonstrated that the inorganic carrier M'O and the carbon particles enhance electrochemical reversibility of the cocrystalline composite materials.

Hereinafter, the present invention will be described in more detail with reference to the following examples.

EXAMPLE

Example 1

2 mole of diammonium hydrogen phosphate and 0.25 mole of citric acid were mixed and dissolved in 300 ml of deionized water to form an acidic solution. 10 ml of Triton X-100 (a nonionic surfactant) was added to the acidic solution. After the acidic solution and the Triton X-100 were thoroughly mixed, 2 mole of ferrous chloride was added to form a mixture of ferric phosphate and ferrous phosphate at a temperature of 20~30□ C. With thorough stiffing, 2 mole of lithium chloride was added. A 99% acetic acid was titrated until the pH value of the reaction solution was adjusted to 5. With continuous stiffing, the reaction solution was completely dispersed.

After continuous stirring over a course of 48 hours, the dispersed solution was filtered through a polypropylen filter to form a solid-state mixture of ferric phosphate and ferrous phosphate. The solid-state mixture was washed with distilled water to remove contaminate.

The solid-state mixture of ferric phosphate and ferrous phosphate, 600 ml of distilled water and 0.02 mole of magnesium oxide were placed into a ball mill jar, and thoroughly milled and dispersed in the ball mill jar to form a semicrystalline nano-scale particle mixture.

The suspension was spray-dried into precursor. Next, the precursor was placed in an aluminum oxide crucible. The precursor was supported on the aluminum oxide crucible and then placed in a furnace where carbon powder was placed. The furnace was raised to 800° C. at a step rate of 20° C. and maintained at 800° C. for 24 hours under an argon gas environment. In the furnace, carbon particles were suspended in the argon carrier gas and mixed with the precursor to result in a composite material having a lithium ferric phosphate as a matrix and cocrystallized with magnesium oxide and carbon ($Li_xFeO_{4-y}PO_y.MgO/C$).

Example 2

2 mole of diammonium hydrogen phosphate and 0.25 mole of citric acid were mixed and dissolved in 300 ml of deionized water to form an acidic solution. 10 ml of BS-12 (Cocoal kanoy lamido propyl betaine, an amphoteric surfactant) was added to the acidic solution. After the acidic solution and the BS-12 were thoroughly mixed, 2 mole of ferrous chloride was added to form a mixture of ferric phosphate and ferrous phosphate at a temperature of 20~30□ C. With thorough stirring, 2 mole of lithium chloride was added. A 99% acetic acid was titrated until the pH value of the reaction solution was adjusted to 5. With continuous stiffing, the reaction solution was completely dispersed.

After continuous stirring over a course of 48 hours, the dispersed solution was filtered through a polypropylen filter to form a solid-state mixture of ferric phosphate and ferrous phosphate. The solid-state mixture was washed with distilled water to remove contaminate.

The solid-state mixture of ferric phosphate and ferrous phosphate, 600 ml of distilled water and 0.02 mole of titanium oxide were placed into a ball mill jar, and thoroughly milled and dispersed in the ball mill jar to form a semicrystalline nano-scale particle mixture.

The solution was spray-dried into a precursor. Next, the precursor was placed in an aluminum oxide crucible. The precursor was supported on the aluminum oxide crucible and then placed in a furnace where carbon powder was placed. The furnace was raised to 800° C. at a step rate of 20° C. and maintained at 800° C. for 24 hours under an argon gas environment. In the furnace, carbon particles were suspended in the argon carrier gas and mixed with the precursor to result in a composite material having a lithium ferric phosphate as a matrix and cocrystallized with titanium oxide and carbon ($Li_xFeO_{4-y}PO_y.TiO_2/C$).

Example 3

2 mole of diammonium hydrogen phosphate and 0.25 mole of citric acid were mixed and dissolved in 300 ml of deionized water to form an acidic solution. 10 ml of DNP (a cationic surfactant) was added to the acidic solution. After the acidic solution and the DNP were thoroughly mixed, 2 mole of ferrous chloride was added to form a mixture of ferric phosphate and ferrous phosphate at a temperature of 20~30□ C. With thorough stirring, 2 mole of lithium chloride was added. A 99% acetic acid was titrated until the pH value of the reaction solution was adjusted to 5. With continuous stirring, the reaction solution was completely dispersed.

After continuous stirring over a course of 48 hours, the dispersed solution was filtered through a polypropylen filter to form a solid-state mixture of ferric phosphate and ferrous phosphate. The solid-state mixture was washed with distilled water to remove contaminate.

The solid-state mixture of ferric phosphate and ferrous phosphate, 600 ml of distilled water and 0.02 mole of vanadium oxide were placed into a ball mill jar, and thoroughly milled and dispersed in the ball mill jar to form a semicrystalline nano-scale particle mixture.

The solution was spray-dried into a precursor. Next, the precursor was placed in an aluminum oxide crucible. The precursor was supported on the aluminum oxide crucible and then placed in a furnace where carbon powder was placed. The furnace was raised to 800° C. at a step rate of 20° C. and maintained at 800° C. for 24 hours under an argon gas environment. In the furnace, carbon particles were suspended in the argon carrier gas and mixed with the precursor to result in a composite material having a lithium ferric phosphate as a matrix and cocrystallized with vanadium oxide and carbon ($Li_xFeO_{4-y}PO_y.V_2O_5/C$).

Example 4

The composite material obtained from respective Examples 1, 2 and 3 was mixed with carbon black and polyvinylidene difluoride (PVDF) in a weight ratio of 80:10:10 in 1 ml N-methyl-pyrrolidone (NMP) solvent. Then, the mixture was coated on an aluminum foil and dried at 120° C. to form a positive electrode test specimen having a thickness of 150 mm. The positive electrode test specimen was combined with a lithium negative electrode to form a coin-type electrochemical reversible half-cell.

Example 5

Diffraction patterns of the powdered samples were obtained with an X-ray diffractometer using Cu Kα radiation, collected at a 2θ range from 10 to 80°. Structural parameters were refined by using the computer program.

Results of Evaluation Tests

Capacity

Table. 1 shows specific capacity versus voltage of the cocrystalline composite material ($A_xMO_{4-y}XO_y.M'O/C$) used in the coin-type electrochemical reversible half-cell. The applied charge/discharge voltage is ranged from 2.0 V to 4.2 V, the charge/discharge rate is set to C/5, and the temperature is maintained at room temperature. From the results shown the specific capacity of the initial discharge curve may reach to ~144 mAh/g at different metal oxide. After ten charge/discharge cycles, the specific capacity of the discharge curve may reach to ~146 mAh/g.

These results of table 1 demonstrate that the electrochemical reversible half-cell of the present invention has good cycle stability and charge/discharge performance.

Cyclic Voltammograms

Figure 4A:
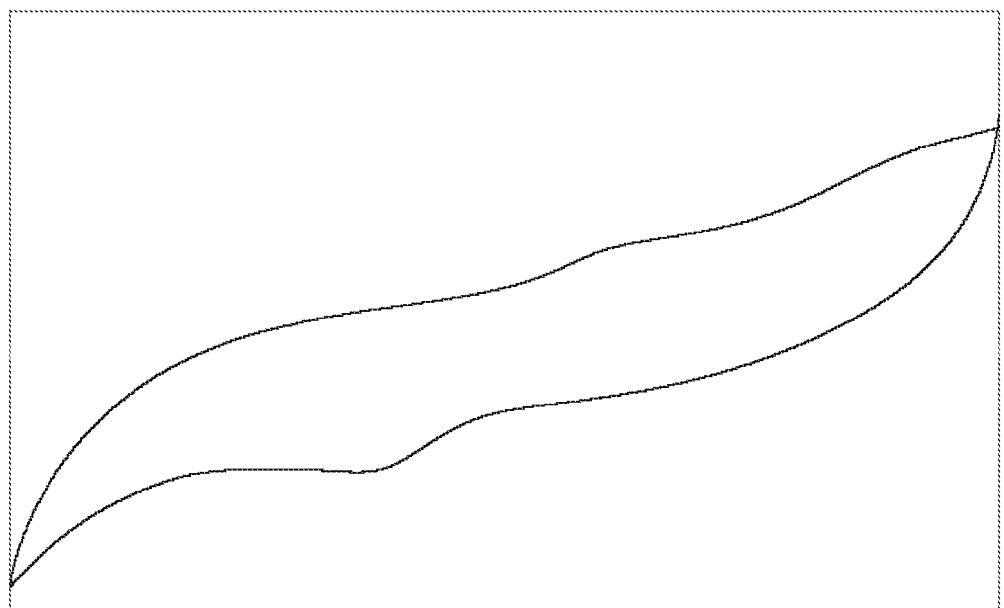
FIGS. 4(a) and (b) are plots illustrating cyclic voltammograms for $MO_{4-y}XO_y$ and $A_xMO_{4-y}XO_y.M'O/C$ prepared at room temperature, respectively.
Figure 4B:
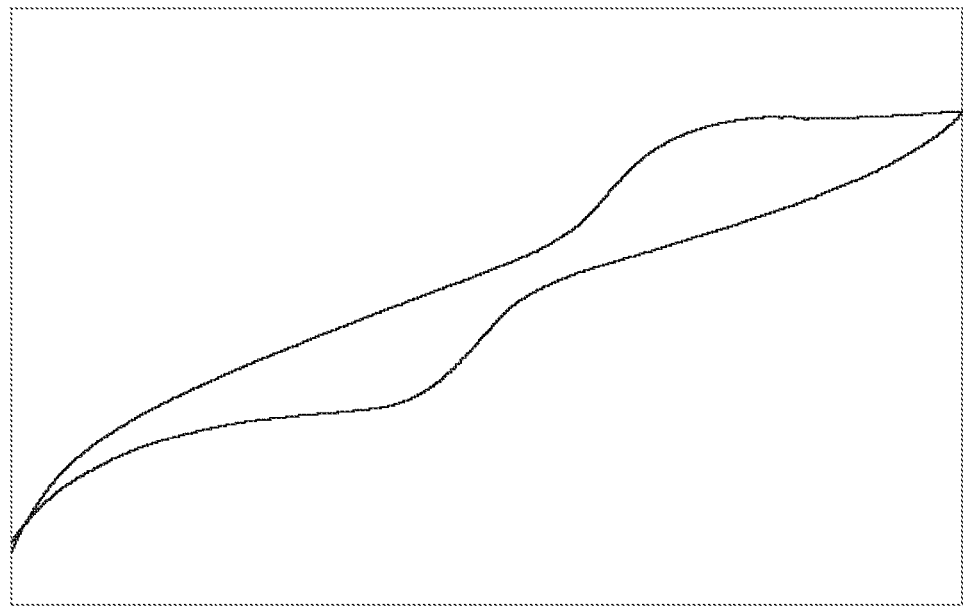

FIGS. 4(a) and 4(b) are cyclic voltammograms schemes of the cocrystalline composite material $A_xMO_{4-y}XO_y \cdot M'O/C$ and $MO_{4-y}XO_y$ in 3M $LiNO_{3(aq)}$, respectively.

X-Ray Diffraction Pattern

Figure 5:
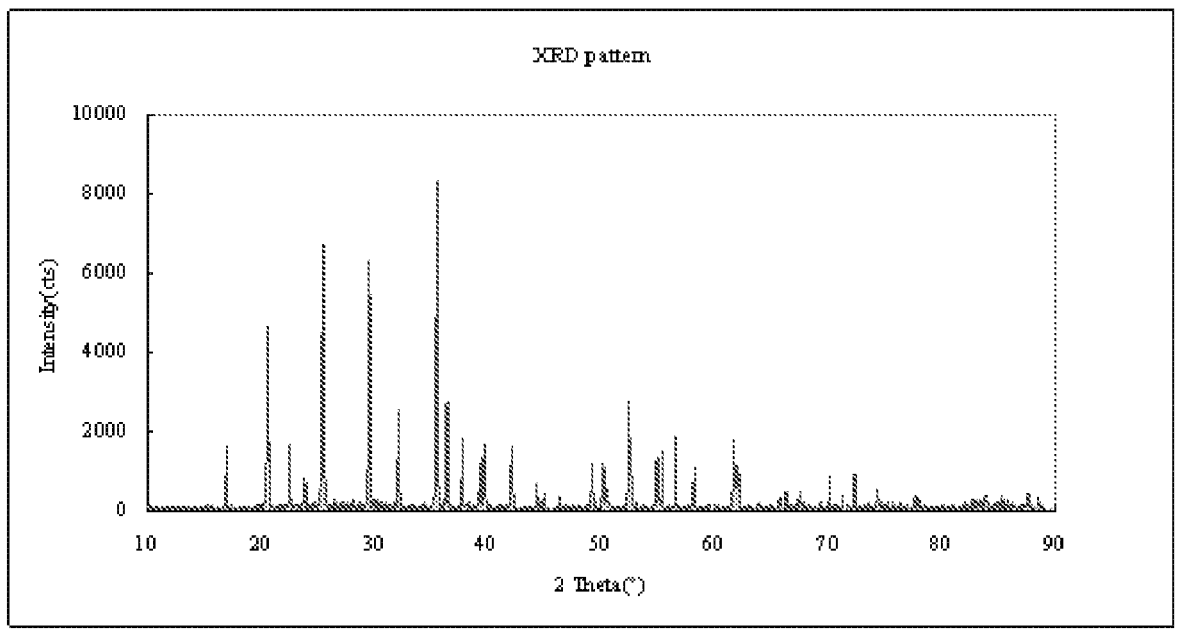
FIG. 5 is a plot shows powdered XRD profiles measured for the composite material $A_xMO_{4-y}XO_y.M'O/C$, Cu Kα radiation.

The powdered composite material formed in Example 1 was analyzed by Cu Kα Powder X-ray diffraction and the results are shown in table. 2. The X-ray pattern shown in FIG. 5 demonstrates that the powdered composite material $A_xMO_{4-y}XO_y \cdot M'O/C$ has a cocrystalline structure.

AEM Photograph

Figure 6:
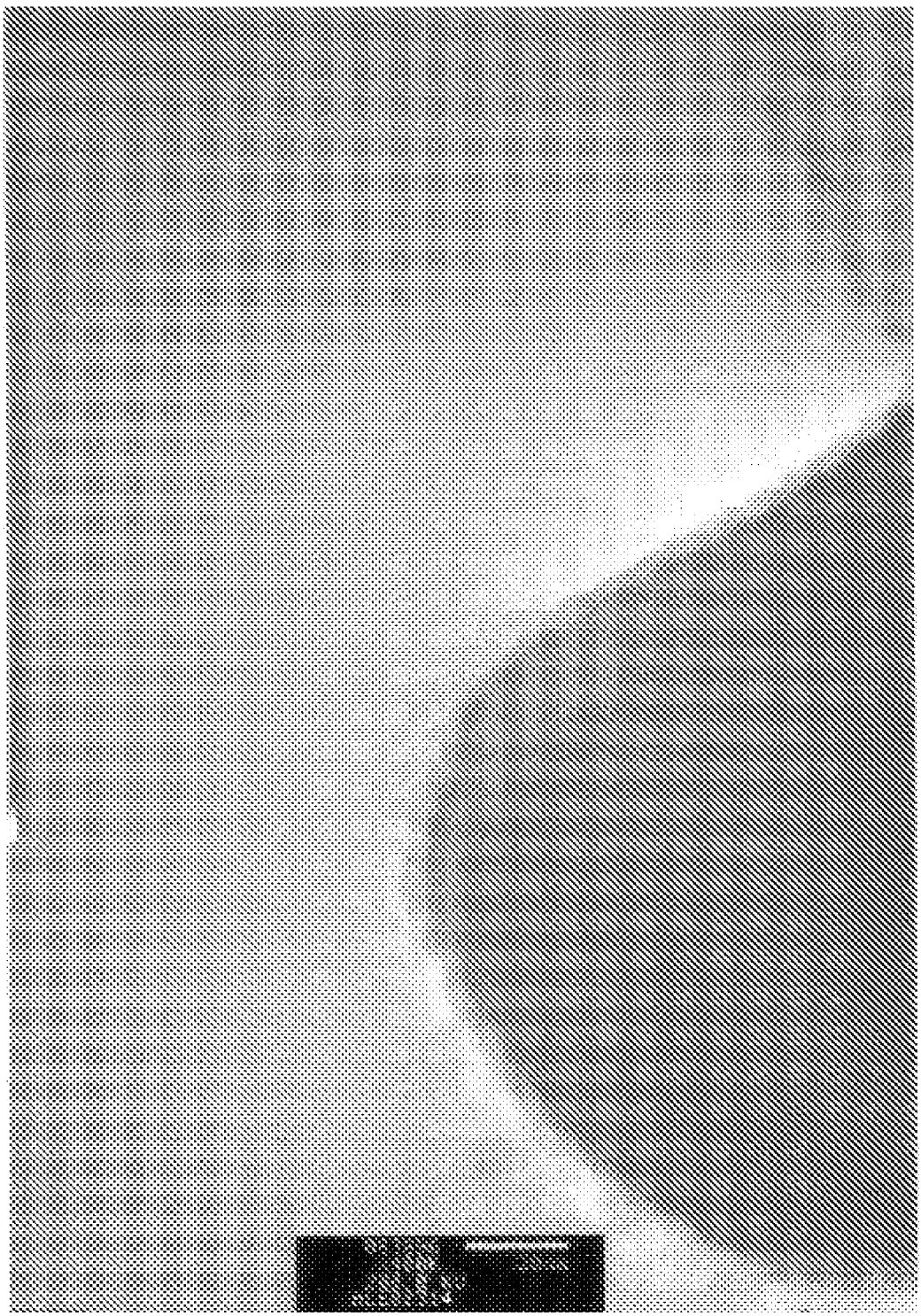
FIG. 6 is an AEM photograph illustrating the surface morphology of the powdered composite material $A_xMO_{4-y}XO_y.M'O/C$.

FIG. 6 is an AEM (analytical transmission electron microscope) photograph illustrating the surface morphology of the cocrystalline composite material $A_xMO_{4-y}XO_y \cdot M'O/C$.

Advantages

From the above description, the electrochemical redox active materials of the present invention and their manufacturing processes are advantageous over the prior art. For example, by adding the ionic, nonionic or amphoteric surfactants, the rate of reacting metallic particle with the phosphate- or arsenate-containing solution is enhanced. As a result, the reaction temperature of the metallic particle with the phosphate- or arsenate-containing solution may be decreased from 70~80° C. (conventional method) to 20~35° C. Since no organic solvent is used and no organic material is pyrolyzed to form conductive carbonaceous material, the environmental pollution is minimized. Moreover, the electrochemical redox active material of the present invention has good structural stability and excellent electrochemical reversibility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrochemical redox active material comprising a cocrystalline metallic compound having a general formula $A_xMO_{4-y}XO_y \cdot M'O$, where A is at least one metallic element selected from a group consisting of alkali metals, M and M' may be identical or different, M is at least one selected from a group consisting of transition metals and semimetals, M' is at least one selected from a group consisting of transition metals and Mg, X is P or As, $0.9 \leq x \leq 1.1$, and $0 < y < 4$.

2. The electrochemical redox active material according to claim 1 wherein A is at least one selected from a group consisting of Li, Na and K.

3. The electrochemical redox active material according to claim 1 wherein A is Li.

4. The electrochemical redox active material according to claim 1 wherein M is at least one selected from a group consisting of Sc, Ti, V, Cr, Mn, Fe, Co, Ni, Cu, Zn, Y, Zr, Nb, Mo, W, Pd, Ag, Pt, Cd, Sb, Si and Ge, and M' is at least one selected from a group consisting of Sc, Ti, V, Cr, Mn, Fe, Co, Ni, Cu, Zn, Y, Zr, Nb, Mo, W, Pd, Ag, Pt, Cd, Sb and Mg.

5. The electrochemical redox active material according to claim 1 wherein M is Fe.

6. The electrochemical redox active material to claim 1 wherein M' is Mg, Ti or V.

7. The electrochemical redox active material according to claim 1 further including a layer of carbon formed on said cocrystalline metallic compound.

* * * * *